US011853401B1

(12) United States Patent
Nookula et al.

(10) Patent No.: US 11,853,401 B1
(45) Date of Patent: Dec. 26, 2023

(54) MACHINE LEARNING MODEL CREATION VIA USER-CONFIGURED MODEL BUILDING BLOCKS

(71) Applicant: Amazon Technologies, Inc., Seattle, WA (US)

(72) Inventors: Nagajyothi Nookula, Seattle, WA (US); Poorna Chand Srinivas Perumalla, Seattle, WA (US); Matthew James Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1515 days.

(21) Appl. No.: 15/997,948

(22) Filed: Jun. 5, 2018

(51) Int. Cl.
*G06F 3/04842* (2022.01)
*G06N 20/00* (2019.01)
*G06F 8/34* (2018.01)
*H04L 67/10* (2022.01)
*G06F 18/40* (2023.01)
*G06F 18/214* (2023.01)
*G06F 18/21* (2023.01)
*G06N 3/045* (2023.01)

(52) U.S. Cl.
CPC .......... *G06F 18/40* (2023.01); *G06F 3/04842* (2013.01); *G06F 8/34* (2013.01); *G06F 18/214* (2023.01); *G06F 18/217* (2023.01); *G06F 18/2163* (2023.01); *G06N 3/045* (2023.01); *G06N 20/00* (2019.01); *H04L 67/10* (2013.01)

(58) Field of Classification Search
CPC .. G06K 9/6253; G06K 9/6256; G06K 9/6261; G06K 9/6262; G06F 3/04842; G06F 8/34; G06N 3/0454; G06N 20/00; H04L 67/10

USPC .......................................................... 706/15
See application file for complete search history.

(56) References Cited

U.S. PATENT DOCUMENTS

| 2015/0379423 | A1* | 12/2015 | Dirac ..................... G06N 20/00 706/12 |
| 2017/0185904 | A1* | 6/2017 | Padmanabhan .......... G06N 5/04 |
| 2017/0213131 | A1* | 7/2017 | Hammond ............... G06N 3/08 |
| 2018/0293517 | A1* | 10/2018 | Browne .................. G06F 8/437 |
| 2019/0042887 | A1* | 2/2019 | Nguyen ............... G06K 9/6257 |

(Continued)

OTHER PUBLICATIONS

What are advantages of Artificial Neural Networks over Support Vector Machines? by Stack Overflow, published Jul. 2012 (Year: 2012).*

(Continued)

*Primary Examiner* — Stephen S Hong
*Assistant Examiner* — Ahamed I Nazar
(74) *Attorney, Agent, or Firm* — NICHOLSON DE VOS WEBSTER & ELLIOTT LLP

(57) ABSTRACT

Techniques for machine learning (ML) model training and deployment using model building blocks via graphical user interfaces (GUIs) are described. Users can use a GUI provided by an electronic device to select and configure ML aspects for one or more ML models to be trained using identified training data. The electronic device can send a request to cause a model construction service to train one or more ML models based on the user configuration, return results of the training to the user within the GUI, and deploy one or more of the ML models.

20 Claims, 9 Drawing Sheets

(56) References Cited

U.S. PATENT DOCUMENTS

2019/0108445 A1* 4/2019 Huang .................. G06N 3/048

OTHER PUBLICATIONS

Sankaran et al. (DARVIZ: Deep Abstract Representation, Visualization, and Verification of Deep Learning Models, published 2017, pp. 1-4) (Year: 2017).*
Azure Machine Learning, Microsoft Azure Essentials, published 2015, pp. 1-237 (Year: 2015).*

* cited by examiner

MACHINE LEARNING MODEL CREATION VIA USER-CONFIGURED MODEL BUILDING BLOCKS

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for machine learning (ML) model creation via user-configured model building blocks are described. According to some embodiments, users can utilize a relatively simple graphical user interface (GUI) that allows the users the ability to construct, train, verify, examine, and/or deploy various machine learning models via use of a provider network and without needing to directly interact or have knowledge of complex machine learning code, libraries, computational infrastructure, etc. Moreover, in some embodiments users can easily create and train multiple different machine learning models for a particular task using a GUI, and in some embodiments users can create and train new custom types of machine learning models through use of a GUI, e.g., by dragging and dropping various blocks representing machine learning model layers into an ordered collection of layers.

As the desire to apply machine learning techniques in a wide variety of applications and environments is a relatively recent one, many technical and non-technical users have struggled to create and implement such models due to the mathematically and computationally complex nature of machine learning. Thus, a common approach is for users to obtain some sort of "sample" machine learning code/project and attempt to modify it to suit their own purposes. However, this approach is challenging, and often results in a model that is not sufficient for the user's needs. Alternatively, organizations may need to hire a team of machine learning experts to construct custom models, but this is time consuming, extremely expensive, and often not feasible for any of a variety of reasons. Accordingly, it remains extremely difficult for the vast majority of technical or non-technical users to be able to implement machine learning.

Embodiments described herein can provide users with a relatively simple yet extremely powerful GUI allowing users to construct, train, verify, examine, and/or deploy various machine learning models. In some embodiments, a GUI is provided that allows users to utilize a drag and drop interface to create machine learning models by selecting a pretrained ML model from a library of pretrained ML models to be further trained for a particular need, constructing a custom ML model using known ML model building "blocks," request that some type or types ML model be identified and constructed on the user's behalf based on stated user goals, etc.

As described herein, some embodiments provide users the ability to select machine learning "aspects" using a GUI, which can be identifiers of pre-trained learning models, identifiers of model types, individual "blocks" of ML model components such as neural network layers or nodes, hyperparameter values, etc.

Figure 1:
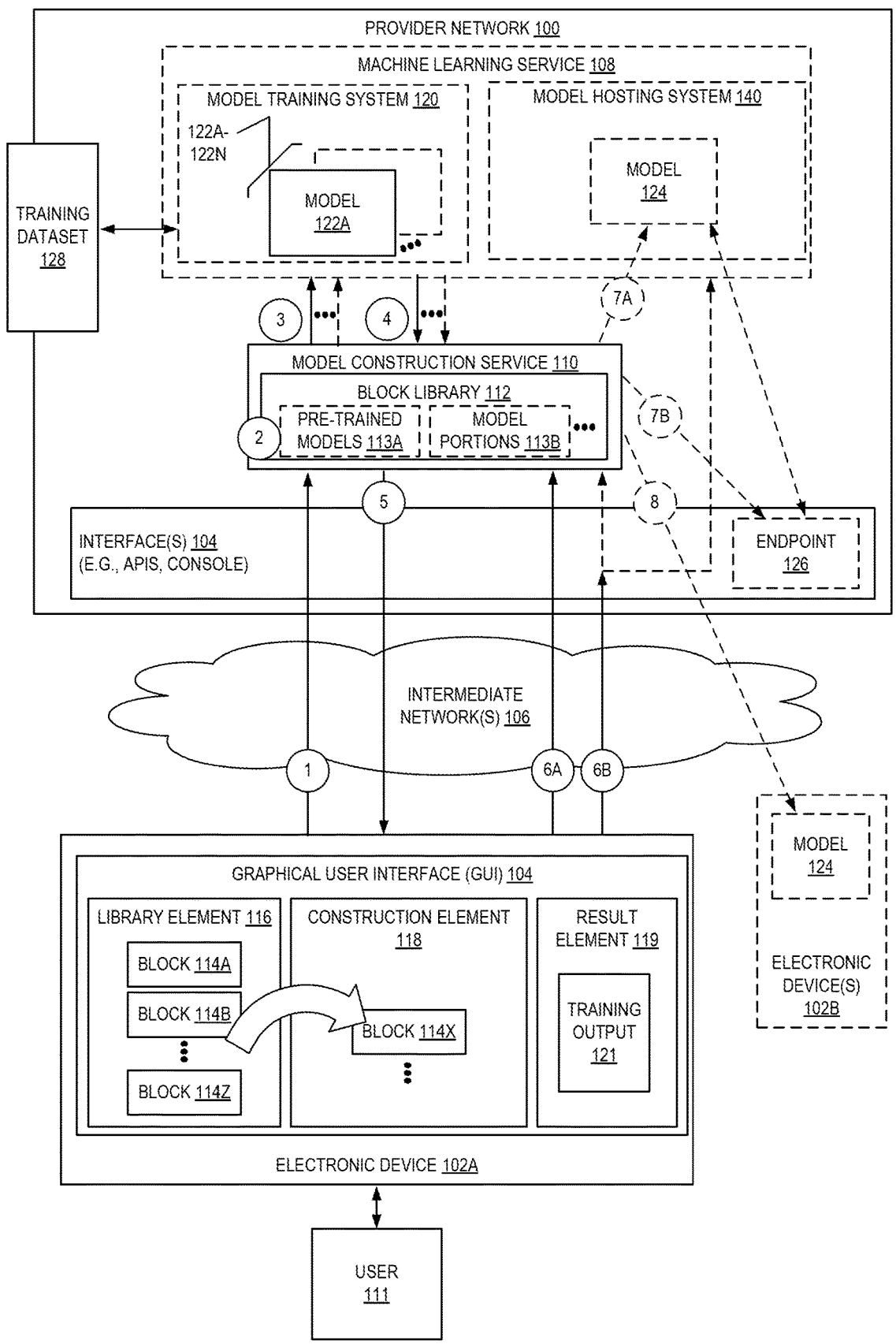
FIG. 1 is a diagram illustrating an environment for machine learning model training and deployment using model building blocks in a graphical user interface according to some embodiments.

FIG. 1 is a diagram illustrating an environment for machine learning model training and deployment using model building blocks in a graphical user interface according to some embodiments. FIG. 1 includes a graphical user interface 104 provided by an electronic device 102A such as a mobile device (e.g., tablet, smartphone) or computing device (e.g., a personal computer (PC), server computing device). The graphical user interface 104 may be provided by a standalone application (e.g., a Windows™ or Mac OS X™ application), as a web application via a web browser, etc.

This exemplary graphical user interface 104 includes a library element 116 providing a set of aspects (here, blocks 114A-114Z) that can be selected by a user 111—e.g., dragging and dropping one or more blocks into a construction element 118, such as the illustrated block 114X. In some embodiments, a user 111 can place one or multiple aspects of ML models into the construction element 118, and these aspects can be ordered/arranged to indicate what type of machine learning model(s) are to be constructed.

For example, a user 111 may simply select one aspect—here, block 114X— indicating that the user desires a particular type of ML model to be constructed (e.g., a YOLO or "Tiny YOLO" real-time object detection system neural network model). As another example, a user 111 may select a number of aspects (e.g., a number of different types of models to be constructed and tested, a number of different portions/components of a ML model such as a particular layer or node) in the construction element 118 and/or simply select a number of aspects from the library element 116. As a more specific example, a user 111 attempting to implement an image classification ML model may browse a variety of pre-trained image classifier blocks 114 available in the library element 116—e.g., ResNet, VGG, etc.—and select a desired classifier block 114 by clicking on its block representation in the library element 116, dragging and dropping its block representation in the library element 116 into the construction element 118, etc.

As described later herein, a user 111 may also provide other aspects or data—e.g., configuration-type data such as hyperparameter values, layer configuration values, ordering information, etc.

Additionally, the user 111 may provide an indicator of a set of data (training data 128) to be used to train and/or validate the model(s). For example, a user may provider a URI, URL, or other identifier of a location where such data can be obtained, which may be provided by a system (e.g., database, object store, file system, etc.) located within the provider network 100 or external to the provider network 100. However, in other embodiments, the user 111 may be instructed (e.g., via the graphical user interface 104) where to place (e.g., upload) the data set 128, or the user 111 may upload the data set 128 via the graphical user interface 104 itself, which may be stored in a storage virtualization service (not illustrated in FIG. 1) of the provider network 100.

When the user 111 has satisfactorily arranged/configured the ML model aspects—here, (at least) block 114X in the construction element 118—the user 111 may use a graphical user interface 104 input element (e.g., a button) to indicate a desire to begin creating and training the model(s).

In response, the electronic device 102A may send a request at circle (1) to a model construction service 110. The request may be, for example, one or more HyperText Transfer Protocol (HTTP) request messages (e.g., GET or POST) sent to an endpoint (e.g., an interface 104) of a provider network in which the model construction service 110 is implemented. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

The request sent at circle (1) may include indications of the one or more aspects (e.g., the blocks assembled/configured by the user via the construction element 118), an identifier of the data set to be used for training and/or validation, and other information provided by the user 111, using the GUI 104, that indicates how a ML model or ML models are to be constructed and trained. The request may be provided by the interfaces 104 to the model construction service 110 which, at circle (2), can construct one or more ML models based on the request. For example, the model construction service 110 may identify the identifiers of the one or more aspects in the request, and obtain code/logic for the corresponding ML models (e.g., from a block library 112, which could store pre-trained models 113A, model portions 114A), ML model portions, etc., and configure the ML model(s) and/or model portions based on the other aspects/information—e.g., orderings, settings, hyperparameter values, etc.

As shown by circle (3), the model construction service 110 can cause one—or multiple—ML models 122A-122N to be trained (or re-trained) according to the user's desires as stipulated by the request. For example, the model construction service 110 may issue one or more commands to a model training system 120 of a machine learning service 108 to train the model(s) using a localized and/or distributed approach. As one example, the model construction service 110 may obtain ML model portions or models from the block library 112 and, e.g., encapsulate them within a container that the model training system 120 can run to train (or, re-train) the model(s), and provide a command to the model training system 120 to perform the training and/or validation (e.g., according to a split of the data set specified by the user 111 and carried in the request, using a default split, etc., to divide the data set into training data and validation data as is known to those of skill in the art). As is known in the art, some pre-trained ML models can be "customized" for particular use cases by re-training them with case-specific training data sets 128—for example, a generic object detection model (that has already been trained to detect some number of objects, e.g., 10,000 different objects) can be retrained to identify new types of objects (e.g., the presence of a drone, multiple brands of shoes, the existence of a hot dog) by retraining the model with a data set 128 of those specific objects.

Upon training the one or more ML models 122A-122N, the results of the training—e.g., resulting model accuracy, training output, log files, etc.—can be provided back to (or otherwise obtained by) the model construction service 110 at circle (4), which, at circle (5) can send this data back to the electronic device 102A to cause the GUI 104 (e.g., the result element 119) to be updated to display the training results as training output 121 to the user 111.

Using the graphical user interface 104, the user 111 may analyze the training output 121, and, for example, decide to modify the model(s) (e.g., via re-arranging blocks in the construction element 118, changing one or more hyperparameter values, etc.) and issuing another command to be sent as another request at circle (6A) to the model construction service 110, which can again cause the model(s) to be retrained accordingly.

Alternatively or additionally, the user 111 may analyze the training output 121 and decide to deploy one or more of the one or more trained ML models. For example, the user 111 may desire to deploy a model 124 to an electronic device 102B (e.g., a server computing device, an "edge" device such as a smart camera, smart speaker, etc.), and may use a user input element of the GUI 104 (not illustrated) to cause the electronic device 102A to send, at circle (6B), a request to the model construction service 110 (and/or machine learning service 108) to deploy the model 124 to the electronic device(s) 102B, though in some embodiments the user 111 may utilize another channel and/or interface to directly or indirectly cause the model 124 to be provided to the electronic device 102B (e.g., via another control application, by logging into the electronic device 102B and downloading the model 124 thereto, etc.). Thus, the model 124 is provided at optional circle (8) to the one or more electronic device(s).

As another possibility, the user 111 may seek to deploy one or more of the models within the provider network 100. Thus, at circle (6B) the request may be issued to the to the model construction service 110 (and/or machine learning service 108) to deploy the model 124. The model 124 may be deployed within a model hosting system 140 of the machine learning service 108, executed by a compute instance (e.g., provided by a hardware virtualization service), etc., at circle (7A). At circle (7B), the model construction service 110 may optionally cause an endpoint 126 to be configured to cause network traffic (e.g., inference requests and/or responses) to be routed to and/or from the model 124 to requesting clients, which may be within and/or outside of the provider network 100.

Figure 2:
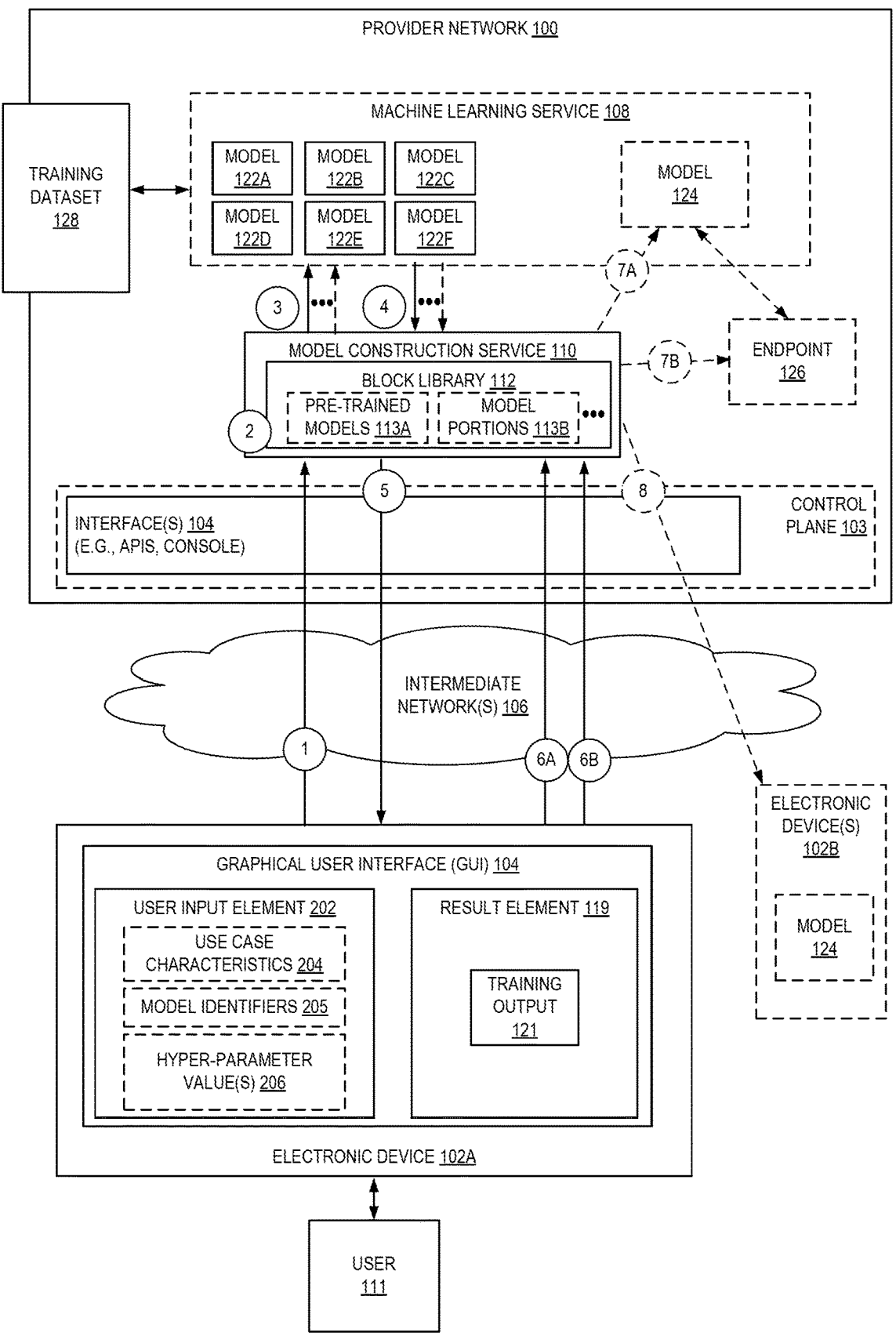
FIG. 2 is a diagram illustrating an environment for machine learning model training and deployment using model characteristic information via a graphical user interface with model variant exploration according to some embodiments.

For further exploration of additional embodiments, FIG. 2 is a diagram illustrating an environment for machine learning model training and deployment using model characteristic information provided via a graphical user interface with model variant exploration. Instead of (or in addition to) a user 111 constructing a ML model via arranging and configuring ML model aspects such as blocks 114, a user 111 may provide other types of ML model aspects via a user input element 202 to cause one or multiple models to be trained.

For example, in some embodiments, a user 111 may provide use case characteristics 204 such as a type of ML model that is desired (e.g., object detection), a desired accuracy level of a resultant model, etc., which can be provided in the request issued at circle (1), allowing the model construction service 110 to identify one or multiple models (e.g., pre-trained models) meeting the use case characteristics 204 available in the block library 112 (e.g., in a collection of pre-trained models 113), and cause these matching models to be trained (and/or determine whether the trained models meet a desired output characteristic such as the accuracy). As shown in FIG. 2, in this example case the model construction service 110 may have identified six different types of ML models 122A-122F that may satisfy a user's stated use case characteristics 204 and caused these ML models 122A-122F to be trained/re-trained using the training dataset 128. Thereafter, the results (or training output 121) can be provided back to the GUI 104 of the user 111, who can decide to perform one or more different training runs (e.g., by modifying hyperparameter values 206 for one or more of the models, such as learning rate, batch size, desired epoch, etc., using GUI input elements such as textboxes, sliders, dropdown selection elements, etc.) and/or select a trained model to be deployed as described above with regard to FIG. 1.

In some embodiments, the user 111 may select one or multiple types of ML models that are desired to be trained as a set of model identifiers 205 via the user input element 202. Thus, these model identifiers 205 can be provided in the request issued at circle (1), and the model construction service 110 can simply train those specified models. In some embodiments, the user 111 may also provide hyperparameter values 206 for one or more of the models that are to be used for the training.

Figure 3:
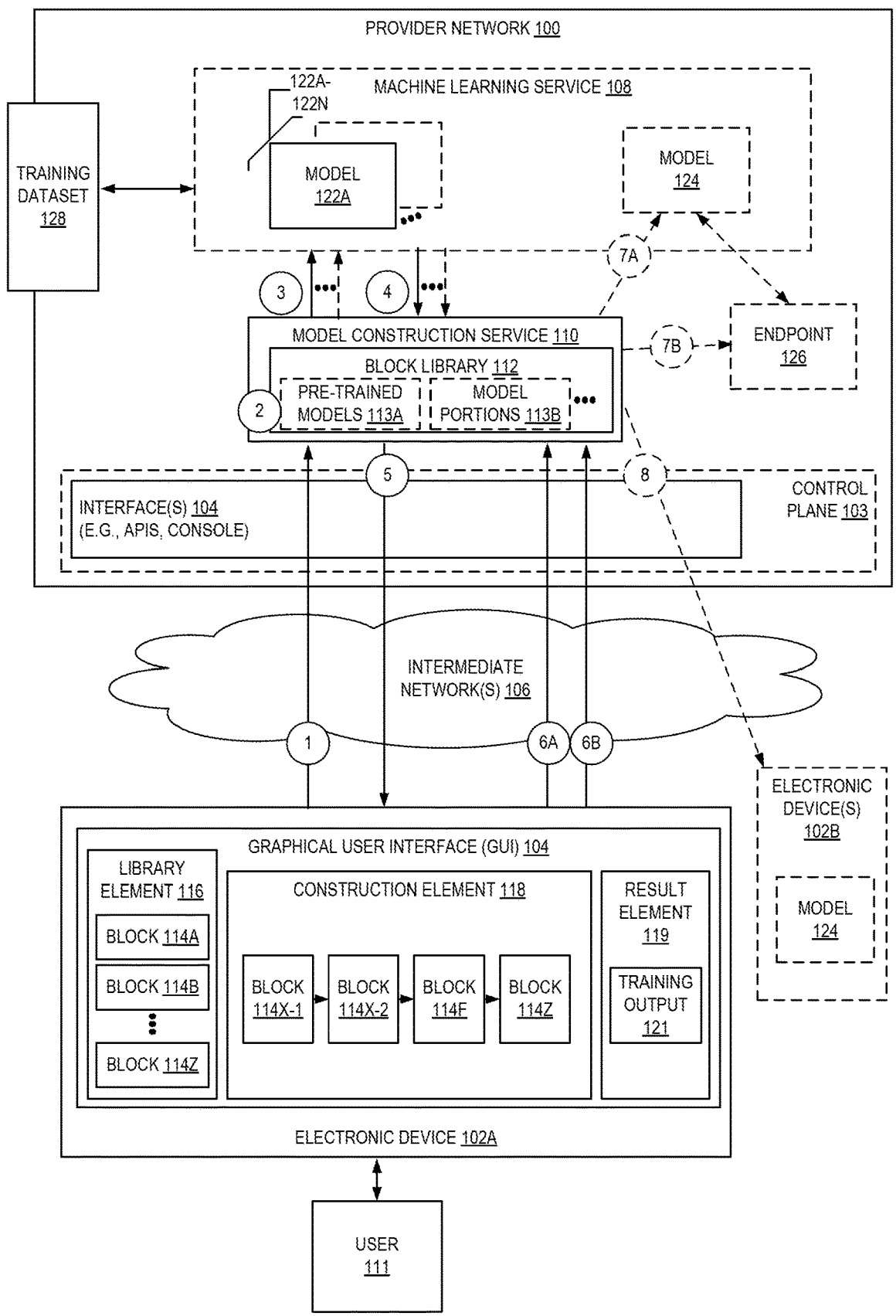
FIG. 3 is a diagram illustrating an environment for machine learning model training and deployment via user-selected and arranged machine learning model sub-blocks via a graphical user interface according to some embodiments.

Additionally, FIG. 3 is a diagram illustrating an environment for machine learning model training and deployment via user-selected and arranged machine learning model sub-blocks via a graphical user interface according to some embodiments. Users 111, in some embodiments, can construct "custom" ML models using a simple GUI 104. Some types of ML models, such as neural networks, are composed of a number of "layers". Layers may be made up of a number of interconnected nodes that have an activation function. Patterns are presented to the network via an input layer, which may communicate to one or more hidden layers where the actual processing is done via a system of weighted connections. The hidden layers may then link to an output layer where a result is output. For example, a VGG neural network (for object detection) may accept input images of a particular size (e.g., 224*244*3 (RGB image)), and include a number of layers (e.g., 16 layers) including a number of convolutional layers, a number of max pool layers, a number of fully-connected layers, etc. Each type of layer (and other types of layers used in other types of ML models) may be provided as blocks 114 (which may be thought of as "sub-blocks" or "operations") in the library element 116 that can be selected and arranged/configured in the construction element 118 to generate a new/customized ML model. As shown, the user 111 has assembled a simple model with four blocks 114X-1, 114X-2, 114F, and 144Z, with connections between the blocks shown as arrows, though in various embodiments other types of representations can be used.

Additionally or alternatively, the sub-blocks of an existing ML model can be provided to a user within the construction element 118 to be used as a starting point, upon which users can further customize a model by changing the configuration of existing blocks, rearranging blocks, adding and/or removing blocks, etc. Additionally or alternatively, a set of sub-blocks of a model can be constructed by the model construction service 110 (and provided to the electronic device 102A) by analyzing a number of ML models (e.g., in block library 112) to identify common and/or frequently used sub-blocks/operators or patterns of sub-blocks within a category of models, and pre-fill such common and/or frequently used sub-blocks/operators in the construction element 118 to again provide the user 111 a helpful starting point in constructing a new model.

As one illustrative example, the model construction service 110 may identify a certain class of model (e.g., object detection), and examine a number of these models (e.g., ten different object detection algorithms), and determine that eight of them have five convolution layers and five max pool layers. Thus, the model construction service 110 may put five convolutions and five max pool layers in the construction element 118. Further, the model construction service 110 may determine that every one of these models has a fully-connected layer, so it may add a fully-connected layer in the construction element 118. Further, the model construction service 110 may identify that a majority of these models have a softmax layer, so a softmax layer is added to the construction element 118. Thus, this constructed model can be provided to the user via the GUI 104, and the user may train it as-is or modify it and then train it. Then, based on the resultant accuracy (e.g., provided in the training input 121 of the result element 119 of the GUI 104), the user may choose to further modify the model (e.g., add one more convolutional layer with a different structure) and test it to see if it improves the resultant accuracy, and/or deploy the model when it is sufficient for the user 111.

Figure 4:
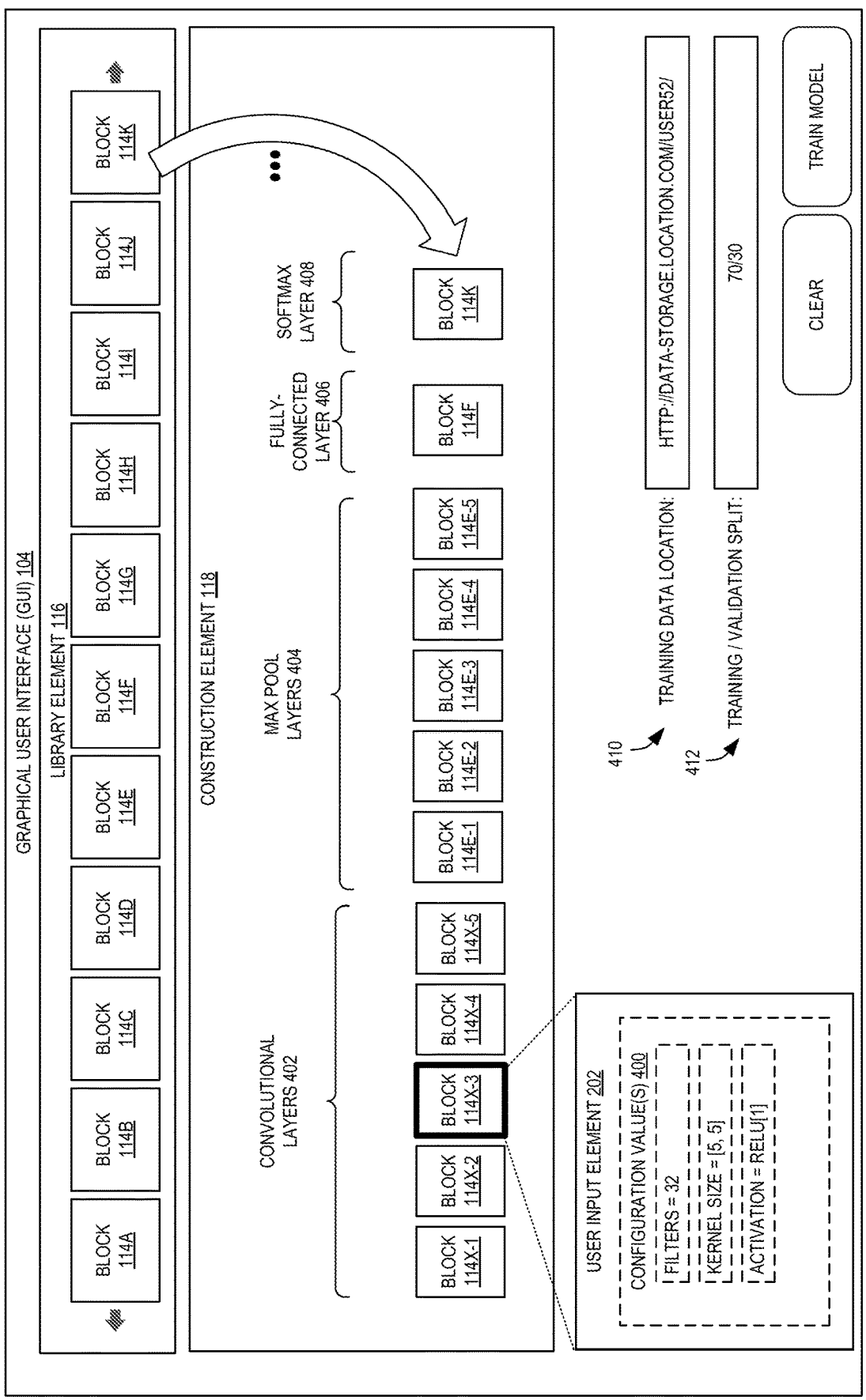
FIG. 4 is a diagram illustrating a graphical user interface for machine learning model training and deployment according to some embodiments.

For further understanding, FIG. 4 is a diagram illustrating a graphical user interface 104 for machine learning model training and deployment according to some embodiments. As shown, the library element 116 may show a number of blocks 114A-114K such as pre-trained models, sub-blocks/operators, etc., that can be selected and/or dragged and dropped into the construction element 118, and arranged and configured. For example, a user may construct a model with a number of convolutional layers 402 (blocks 114X-1 through 114X-5), a number of max pool layers 404 (blocks 114E-1 through 114E-5), a fully-connected layer 406 (block 114F), and a softmax layer 408. Particular blocks, or the model as a whole, may also be further configured by a user input element 202. In this case, a user input element 202 is shown that corresponds to a convolutional layer 402 (block 114X-3), and allows the user to provide ML model aspects in the form of configuration values 400 (e.g., a number of filters, a kernel size, an activation function identifier, etc.). The user may also provide, via the GUI 104, an identifier (e.g., a URL or other identifier) of the training data set 128, and/or a training-to-validation split 412 indicating what percentages of the training data set 128 are to be used for training and then for validation. Of course, in various embodiments these and other types of ML model aspects can be provided by a user, and may be provided via different types of graphical user interface input elements. Additionally, ones of these model aspects may be suggested (or used as defaults) so that a user need not indicate a particular value, but rely upon a sensible or predicted default, further improving the user-friendliness of the system.

Figure 5:
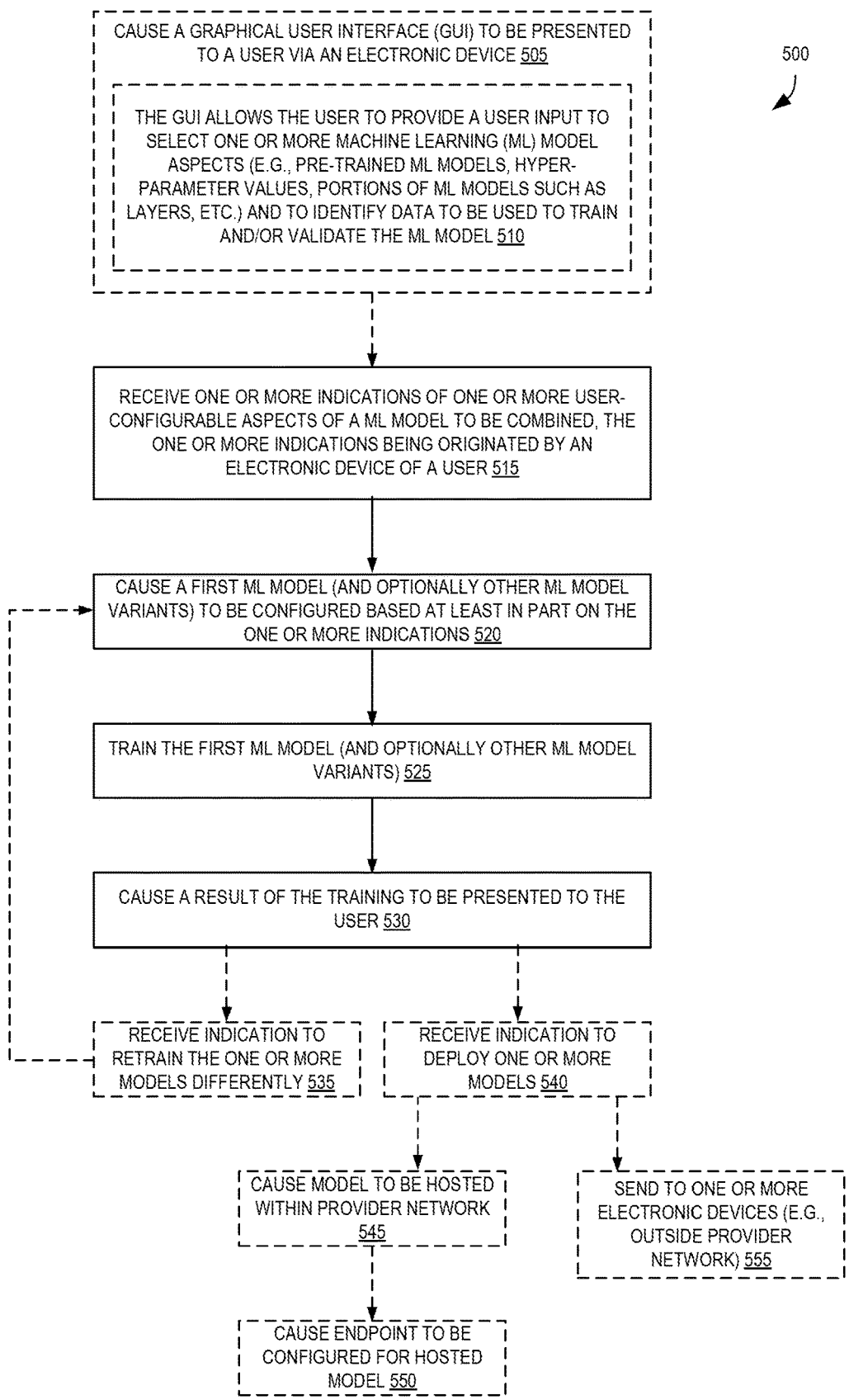
FIG. 5 is a flow diagram illustrating operations of a method for machine learning model training and deployment according to some embodiments.

FIG. 5 is a flow diagram illustrating operations of a method for machine learning model training and deployment according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by model construction service 110 (and/or ML service 108, provider network 100, or electronic device 102A) of the other figures.

The operations 500 optionally include, as shown by dashed-lined block 505, causing a graphical user interface (GUI) to be presented to a user via an electronic device. Block 505 may include transmitting data for a web page to be shown to a user, data for another type of application, etc. The data may include display code (e.g., Cascading Style Sheets (CSS), HTML) and data for the various types of elements disclosed herein (e.g., library element 116, construction element 118, result element 119, etc.). The data may be sent using HTTP response messages sent in response to an HTTP request message issued by the electronic device seeking the data for the GUI.

In some embodiments, as shown by dashed-lined block 510, the GUI allows the user to provide a user input to select one or more machine learning (ML) model aspects (e.g., pre-trained ML models, hyper-parameter values, portions of ml models such as layers/operations, etc.) and to identify data to be used to train and/or validate the ML model.

The operations 500 include, at block 515, receiving one or more indications of one or more user-configurable aspects of a ML model to be combined, the one or more indications being originated by the electronic device of the user. The one or more indications may be carried in an HTTP request message sent by the electronic device of the user to an endpoint of a service provider network responsive to the user's use of a GUI of the electronic device. The one or more user-configurable aspects of a ML model may include one or more of: one or more identifiers of one or more pre-trained models, configuration information for one or more pre-trained models, sub-blocks or layers/operations that together can form a ML model, use case characteristics, hyperparameter values, etc., as described above. Block 515 may also include receiving an identifier (e.g., a URL, name, etc.) of a data set to be used to train and/or validate the one or more ML models, and/or receiving an indication of how to split the data set between training and validation (e.g., a 70/30 split, a 90/10 split, all values used for training except for 10—randomly-chosen or specified—to be used for validation, etc.)

The operations 500 include, at block 520, causing a first ML model (and optionally other ML model variants) to be configured based at least in part on the one or more indications, and, at block 525, training the first ML model (and optionally other ML model variants), e.g., using the data set.

The operations 500 include, at block 530, causing a result of the training to be presented to the user. Block 530 in some embodiments includes transmitting the result via one or more HTTP messages to the electronic device. The result may include one or more of: an accuracy of one or more ML models, output generated by training the models, etc.

The operations 500 may optionally include, as shown by dashed-lined block 535, receiving an indication to retrain the one or more models differently—e.g., with different blocks/aspects, different block orderings, different hyperparameter values, etc. Accordingly, the operations may continue back to block 520.

The operations 500 optionally include, as shown by dashed-lined block 540, receiving an indication to deploy one or more ML models. The indication may be carried in an HTTP request message originated by the electronic device. The indication may specify how the one or more models are to be deployed—e.g., within a provider network, to a particular electronic device, etc. For example, the operations 500 may include blocks 545 and 550, including causing the model to be hosted within the provider network (e.g., using a machine hosting service) and causing an endpoint to be configured for the model so that that requests can be sent to the model(s) (e.g., for inference) and responses can be sent back to clients. As another example, the operations 500 may include sending the ML model(s) to one or more other electronic devices, which may be outside the provider network, such as smart "edge" devices (e.g., smart cameras, smart phones, smart speakers, vehicles), server computing devices, etc., and the indication received in block 540 may identify the particular deployment target using techniques known to those of skill in the art.

In some embodiments the ML model(s) described herein with regard to the earlier figures may be trained and/or run by a model training system 120 and/or model hosting system 140, which may be part of a provider network 600.

Figure 6:
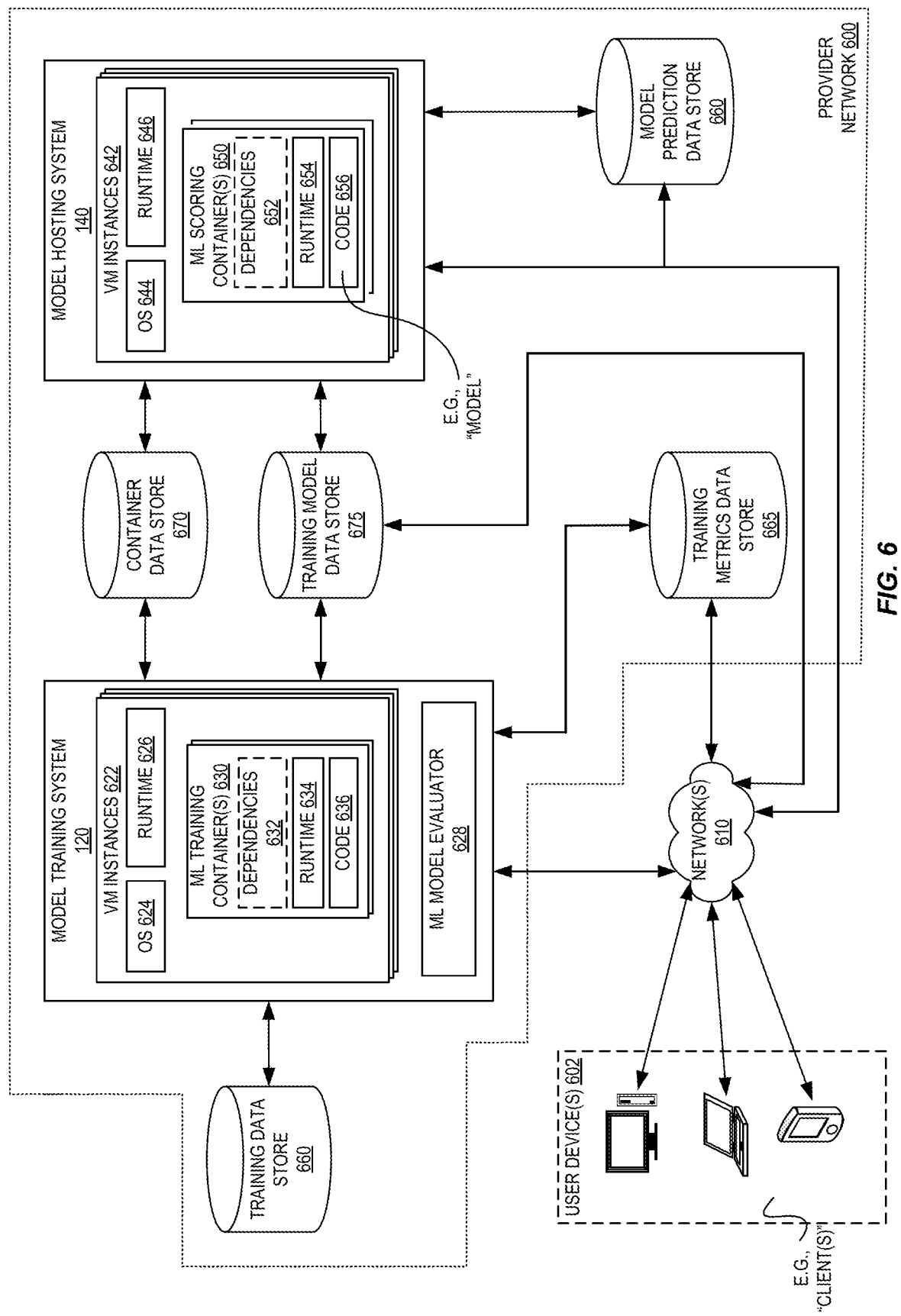
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602, a model training system 120, a model hosting system 140, a training data store 660, a training metrics data store 665, a container data store 670, a training model data store 675, and a model prediction data store 680.

A machine learning service described herein may include one or more of these entities, such as the model hosting system 140, model training system 120, etc.

In some embodiments, users, by way of user devices 602, interact with the model training system 120 to provide data that causes the model training system 120 to train one or more machine learning models. A machine learning model, generally, may be thought of as one or more equations that are "trained" using a set of data. In some embodiments, the model training system 120 provides ML functionalities as a Web service, and thus messaging between user devices 602 and the model training system 120 (or provider network 600), and/or between components of the model training system 120 (or provider network 600), may utilize HTTP messages to transfer data in a machine-readable file format, such as eXtensible Markup Language (XML) or JavaScript Object Notation (JSON).

The user devices 602 can interact with the model training system 120 via frontend 629 of the model training system 120. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 120 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 120 can retrieve the container image from the indicated location and create a container using the retrieved container image. The container is then loaded into a virtual machine instance 622 for training a machine learning model, as described in greater detail below.

The model training system 120 can use the information provided by the user device 602 to train a machine learning model in one or more pre-established virtual machine instances 622 in some embodiments. In particular, the model training system 120 includes a single physical computing device or multiple physical computing devices that are interconnected using one or more computing networks (not shown), where the physical computing device(s) host one or more virtual machine instances 622. The model training system 120 can handle the acquisition and configuration of compute capacity (e.g., containers, instances, etc., which are described in greater detail below) based on the information describing the computing machine on which to train a machine learning model provided by the user device 602. The model training system 120 can then train machine learning models using the compute capacity, as is described in greater detail below. The model training system 120 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance, and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 636, and dependencies 632 needed by the code 636 in some embodiments. The runtime 634 can be defined by one or more executable instructions that form at least a portion of a container image that is used to form the ML training container 630 (e.g., the executable instruction (s) in the container image that define the operating system and/or runtime to run in the container formed from the container image). The code 636 includes one or more executable instructions that form at least a portion of a container image that is used to form the ML training container 630. For example, the code 636 includes the executable instructions in the container image that represent an algorithm that defines a machine learning model, which may reference (or utilize) code or libraries from dependencies 632. The runtime 634 is configured to execute the code 636 in response to an instruction to begin machine learning model training. Execution of the code 636 results in the generation of model data, as described in greater detail below.

In some embodiments, the code 636 includes executable instructions that represent algorithms that define different machine learning models. For example, the code 636 includes one set of executable instructions that represent a first algorithm that defines a first machine learning model and a second set of executable instructions that represent a second algorithm that defines a second machine learning model. In some embodiments, the virtual machine instance 622 executes the code 636 and trains all of the machine learning models. In some embodiments, the virtual machine instance 622 executes the code 636, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 120 uses one or more container images included in a training request (or a container image retrieved from the container data store 670 in response to a received training request) to create and initialize a ML training container 630 in a virtual machine instance 622. For example, the model training system 120 creates a ML training container 630 that includes the container image(s) and/or a top container layer.

Prior to beginning the training process, in some embodiments, the model training system 120 retrieves training data from the location indicated in the training request. For example, the location indicated in the training request can be a location in the training data store 660. Thus, the model training system 120 retrieves the training data from the indicated location in the training data store 660. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 120 can retrieve a second portion of the training data and provide the second retrieved portion to the virtual machine instance 622, and so on.

To perform the machine learning model training, the virtual machine instance 622 executes code 636 stored in the ML training container 630 in some embodiments. For example, the code 636 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 120 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 120 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 636 stored in a plurality of ML training containers 630. For example, the algorithm included in the container image can be in a format that allows for the parallelization of the training process. Thus, the model training system 120 can create multiple copies of the container image provided in a training request and cause the virtual machine instance 622 to load each container image copy in a separate ML training container 630. The virtual machine instance 622 can then execute, in parallel, the code 636 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 120 can significantly reduce the training time in some embodiments.

In some embodiments, a plurality of virtual machine instances 622 execute code 636 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 120 can create multiple copies of the container image provided in a training request, initialize multiple virtual machine instances 622, and cause each virtual machine instance 622 to load a container image copy in one or more separate ML training containers 630. The virtual machine instances 622 can then each execute the code 636 stored in the ML training containers 630 in parallel. The model training system 120 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 622 that execute the code 636. Thus, the parallelization can occur over different physical computing devices in addition to over different virtual machine instances 622 and/or ML training containers 630.

In some embodiments, the model training system 120 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 622 to optionally delete an existing ML training container 630, create and initialize a new ML training container 630 using some or all of the information included in the request, and execute the code 636 stored in the new ML training container 630 to restart the machine learning model training process. As another example, the model training system 120 can cause the virtual machine instance 622 to modify the execution of code stored in an existing ML training container 630 according to the data provided in the modification request. In some embodiments, the user, via the user device 602, can transmit a request to the model training system 120 to stop the machine learning model training process. The model training system 120 can then instruct the virtual machine instance 622 to delete the ML training container 630 and/or to delete any model data stored in the training model data store 675.

As described below, in some embodiments, the model data stored in the training model data store 675 is used by the model hosting system 140 to deploy machine learning models. Alternatively or in addition, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 140, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 642. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 602 via frontend 649 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance, and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 140 uses one or more container images included in a deployment request (or a container image retrieved from the container data store 670 in response to a received deployment request) to create and initialize a ML scoring container 650 in a virtual machine instance 642. For example, the model hosting system 140 creates a ML scoring container 650 that includes the container image(s) and/or a top container layer.

As described above, a user device 602 can submit a deployment request and/or an execution request to the model hosting system 140 via the frontend 649 in some embodiments. A deployment request causes the model hosting system 140 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 140 initializes ones or more ML scoring containers 650 in one or more hosted virtual machine instance 642. In embodiments in which the deployment request includes an identification of one or more container images, the model hosting system 140 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 140 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 140 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 140 unarchives or decompresses the model data file to obtain multiple individual files, and inserts the individual files into the ML scoring container 650. In some embodiments, the model hosting system 140 stores the model data file in the same location as the location in which the model data file was stored in the ML training container 630 that generated the model data file. For example, the model data file initially was stored in the top container layer of the ML training container 630 at a certain offset, and the model hosting system 140 then stores the model data file in the top container layer of the ML scoring container 650 at the same offset.

In embodiments in which multiple model data files are identified in the deployment request, the model hosting system 140 retrieves the identified model data files from the training model data store 675. The model hosting system 140 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 650 with the endpoint identified in the deployment request. For example, each of the initialized ML scoring container(s) 650 can be associated with a network address. The model hosting system 140 can map the network address(es) to the identified endpoint, and the model hosting system 140 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 140 via the frontend 649, where the execution request identifies an endpoint and includes an input to a machine learning model (e.g., a set of input data). The model hosting system 140 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 140 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 120, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 6 are not meant to be limiting. For example, the model training system 120 and/or the model hosting system 140 could also operate within a computing environment having a fewer or greater number of devices than are illustrated in FIG. 6. Thus, the depiction of the model training system 120 and/or the model hosting system 140 in FIG. 6 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 120. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 140. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 120 and the model hosting system 140, this is not meant to be limiting. For example, in some embodiments not shown, the training data store 660 is located internal to at least one of the model training system 120 or the model hosting system 140.

In some embodiments, the training metrics data store 665 stores model metrics. While the training metrics data store 665 is depicted as being located external to the model training system 120 and the model hosting system 140, this is not meant to be limiting. For example, in some embodiments not shown, the training metrics data store 665 is located internal to at least one of the model training system 120 or the model hosting system 140.

The container data store 670 stores container images, such as container images used to form ML training containers 630 and/or ML scoring containers 650, that can be retrieved by various virtual machine instances 622 and/or 642. While the container data store 670 is depicted as being located external to the model training system 120 and the model hosting system 140, this is not meant to be limiting. For example, in some embodiments not shown, the container data store 670 is located internal to at least one of the model training system 120 and the model hosting system 140.

The training model data store 675 stores model data files. In some embodiments, some of the model data files are comprised of a single file, while other model data files are packages of multiple individual files. While the training model data store 675 is depicted as being located external to the model training system 120 and the model hosting system 140, this is not meant to be limiting. For example, in some embodiments not shown, the training model data store 675 is located internal to at least one of the model training system 120 or the model hosting system 140.

The model prediction data store 680 stores outputs (e.g., execution results) generated by the ML scoring containers 650 in some embodiments. While the model prediction data store 680 is depicted as being located external to the model training system 120 and the model hosting system 140, this is not meant to be limiting. For example, in some embodiments not shown, the model prediction data store 680 is located internal to at least one of the model training system 120 and the model hosting system 140.

While the model training system 120, the model hosting system 140, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the network 610.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 120 and/or the model hosting system 140 for submitting training requests, deployment requests, and/or execution requests.

In some embodiments, the network 610 includes any wired network, wireless network, or combination thereof. For example, the network 610 may be a personal area network, local area network, wide area network, over-the-air broadcast network (e.g., for radio or television), cable network, satellite network, cellular telephone network, or combination thereof. As a further example, the network 610 may be a publicly accessible network of linked networks, possibly operated by various distinct parties, such as the Internet. In some embodiments, the network 610 may be a private or semi-private network, such as a corporate or university intranet. The network 610 may include one or more wireless networks, such as a Global System for Mobile Communications (GSM) network, a Code Division Multiple Access (CDMA) network, a Long Term Evolution (LTE) network, or any other type of wireless network. The network 610 can use protocols and components for communicating via the Internet or any of the other aforementioned types of networks. For example, the protocols used by the network 610 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
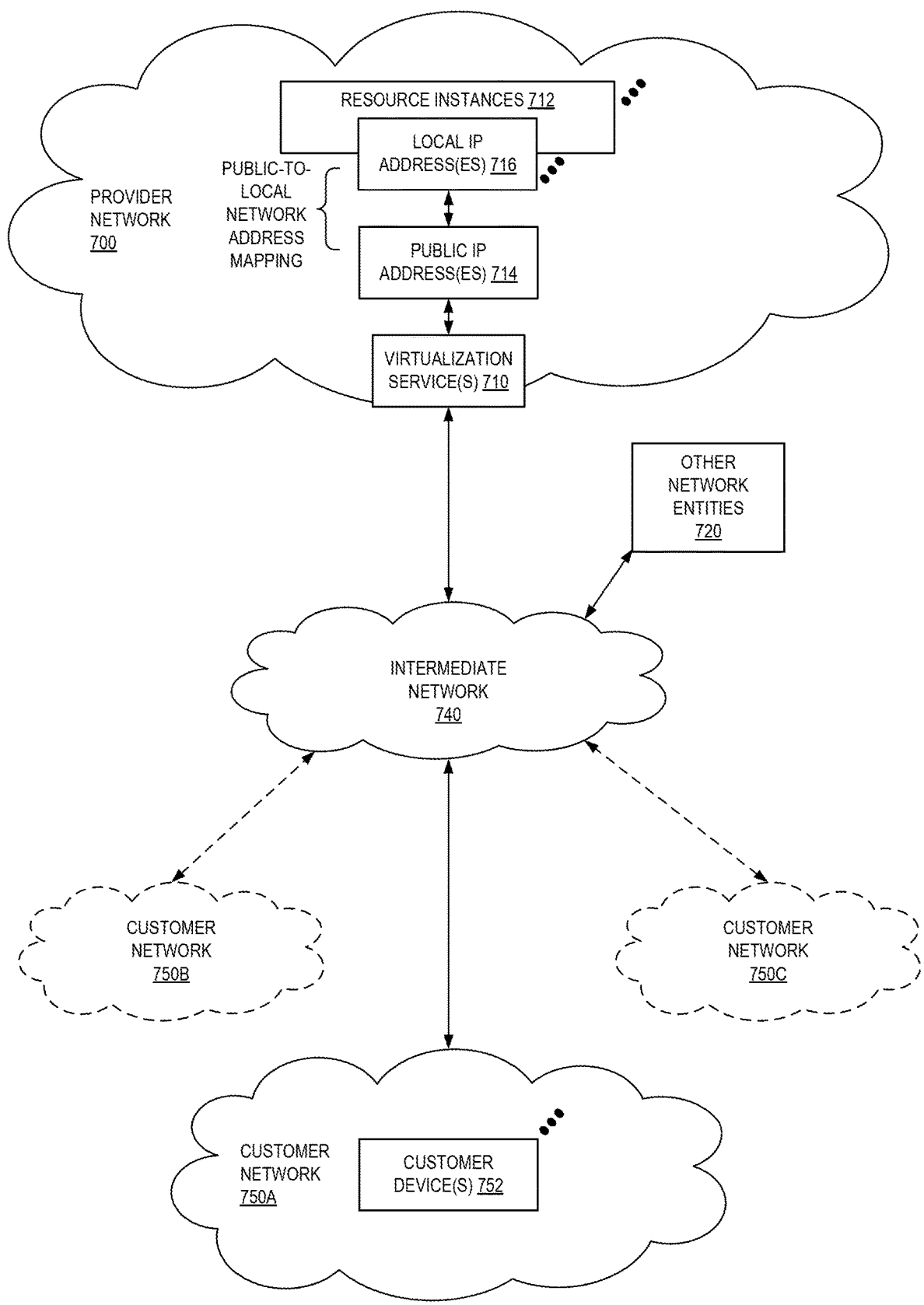
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
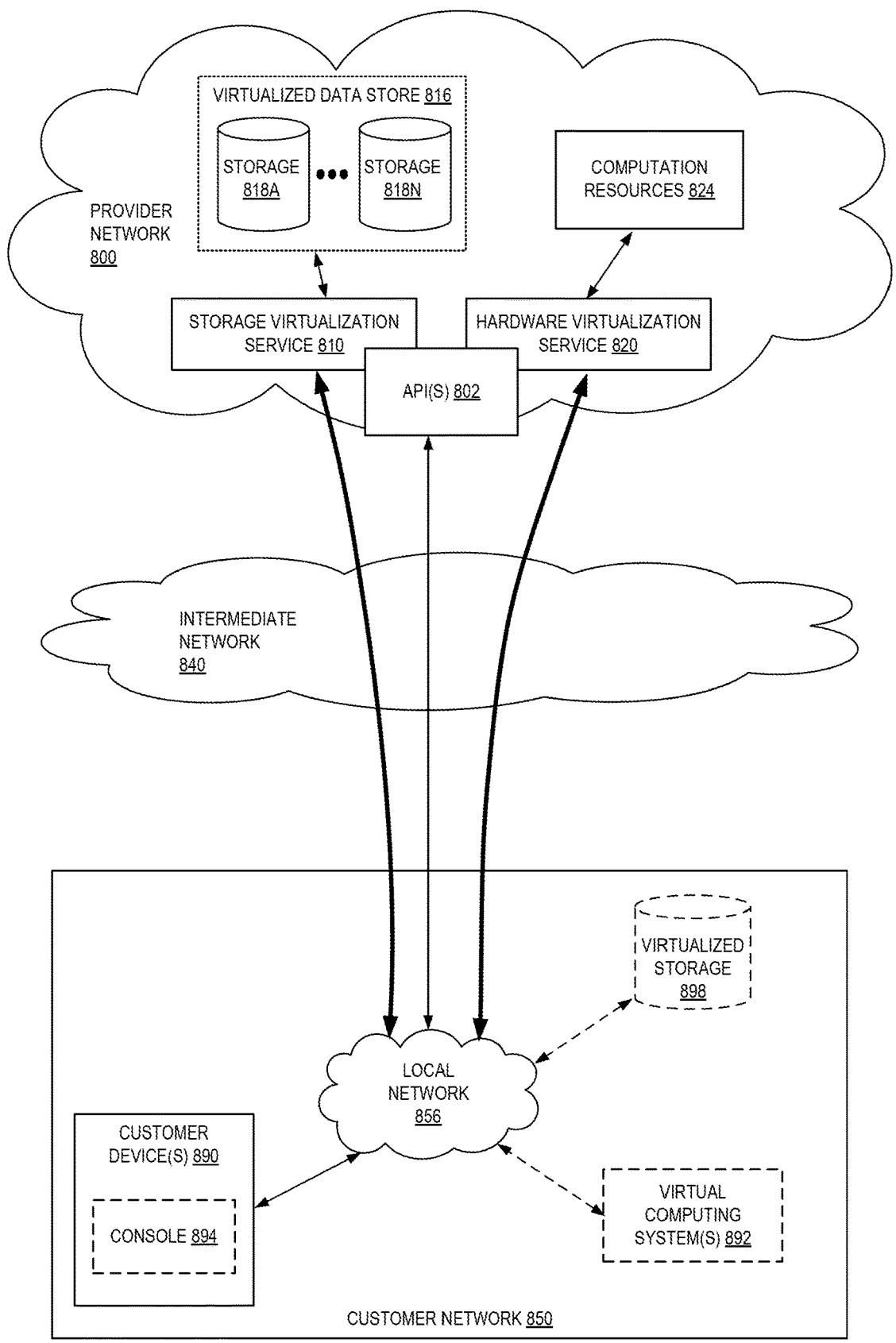
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
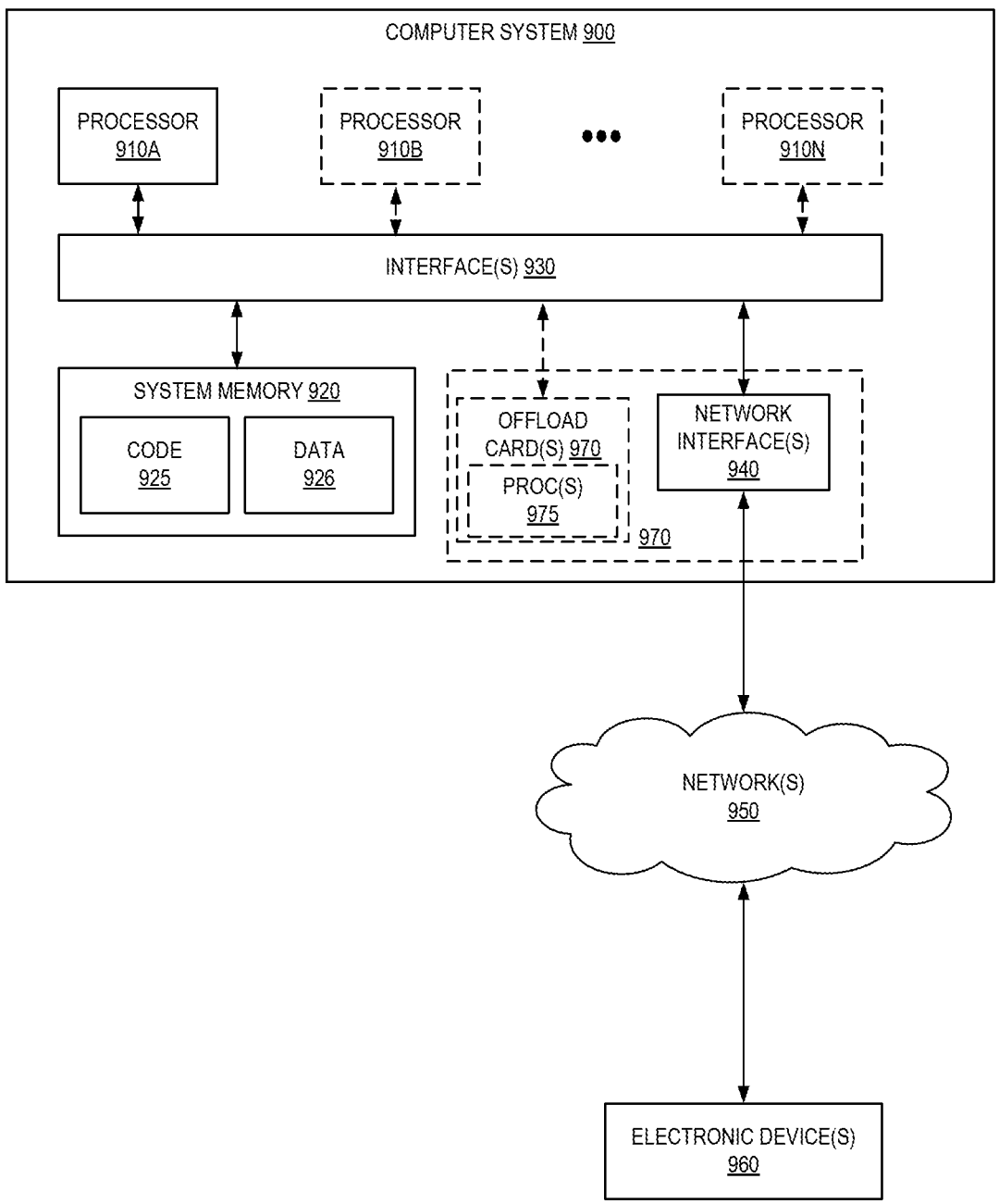
FIG. 9 is a block diagram illustrating an example computer system that may be used in some embodiments.

In some embodiments, a system that implements a portion or all of the techniques for machine learning model training and deployment using model aspects/building blocks in a graphical user interface as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 113A-113B, 114A-114Z, 102A-102B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining a machine learning (ML) use case characteristic for an ML model to be trained;
   identifying, from among a library of pre-trained ML models, a plurality of pre-trained ML models satisfying the ML use case characteristic;
   causing a graphical user interface (GUI) to be presented to a user via an electronic device that allows a user selection of one of the plurality of pre-trained ML models to use to train the ML model and allows a user specification of a location of a data set to use to train the ML model;
   receiving, at a web service endpoint of a provider network, data representing a user selection via the GUI of a particular pre-trained ML model of the plurality of pre-trained ML models and data representing a user specification via the GUI of a particular location of a data set to use to train the ML model;
   training the particular pre-trained ML model in the provider network based at least on a data set at the particular location to yield a trained ML model; and
   causing a result of the training to be presented to in a GUI.

2. The computer-implemented method of claim 1, further comprising:
   receiving a deployment request associated with the trained machine learning (ML) model; and
   causing the trained ML model to be deployed within another electronic device outside the provider network or within the provider network as a service.

3. The computer-implemented method of claim 1, wherein:
   the GUI allows a user specification of a hyperparameter value;
   the method further comprises receiving, at the web service endpoint in the provider network, data representing a user specification via the GUI of a particular hyperparameter value; and
   training the particular pre-trained ML model in the provider network is further based at least in part on the particular hyperparameter value.

4. A computer-implemented method comprising:
   obtaining a machine learning (ML) use case characteristic for an ML model to be trained;
   identifying, from among a library of pre-trained ML models, a plurality of pre-trained ML models satisfying the ML use case characteristic;
   receiving, at an interface of a provider network, data representing a selection of a particular pre-trained ML model of the plurality of pre-trained ML models; and
   training the particular pre-trained ML model to yield a trained ML model.

5. The computer-implemented method of claim 4, further comprising:
   causing a graphical user interface (GUI) to be displayed that allows a user selection of one of the plurality of pre-trained machine learning (ML) models satisfying the ML use case characteristic; and
   wherein data representing the selection of the particular pre-trained ML model represents a user selection via the GUI of the particular pre-trained ML model.

6. The computer-implemented method of claim 4, further comprising:

causing a graphical user interface (GUI) to be displayed that allows a user specification of a location of a data set to use to train the particular pre-trained machine learning (ML) model;

receiving, at the interface of the provider network, data representing a user specification via the GUI of a particular location of a data set to use to train the particular pre-trained ML model; and wherein the particular pre-trained ML model is trained using a data set at the particular location.

7. The computer-implemented method of claim 4, further comprising:

causing a graphical user interface (GUI) to be displayed that allows a user specification of a hyperparameter value to use to train the particular pre-trained machine learning (ML) model;

receiving, at the interface of the provider network, data representing a user specification via the GUI of a particular hyperparameter value to use to train the particular pre-trained ML model; and wherein the particular pre-trained ML model is trained using the particular hyperparameter value.

8. The computer-implemented method of claim 7, the hyperparameter value specifies a learning rate, a batch size, or an epoch.

9. The computer-implemented method of claim 4, wherein the particular pre-trained ML model is a neural network model.

10. The computer-implemented method of claim 4, further comprising:

receiving a deployment request associated with the trained ML model; and causing the trained ML model to be deployed for use.

11. The computer-implemented method of claim 10, wherein causing the trained ML model to be deployed for use comprises transmitting the trained ML model to an edge electronic device.

12. The computer-implemented method of claim 10, wherein causing the trained ML model to be deployed for use comprises:

configuring the trained ML model to be run in a provider network; and creating an endpoint in the provider network to at least receive inference requests and provide the inference requests to be used as input for the trained ML model.

13. The computer-implemented method of claim 4, further comprising:

causing a result of the training to be displayed in a graphical user interface (GUI).

14. The computer-implemented method of claim 13, wherein the result comprises a resulting model accuracy, a training output, or a log file.

15. A system comprising:

a first one or more electronic devices to implement a machine learning (ML) service that trains and hosts ML models, the first one or more electronic devices comprising one or more processors and memory; and a second one or more electronic devices to implement a model construction service, the second one or more electronic devices comprising one or more processors and memory, the model construction service including instructions that upon execution cause the model construction service to:

obtain a machine learning (ML) use case characteristic for an ML model to be trained;

identify, from among a library of pre-trained ML models, a plurality of pre-trained ML models satisfying the ML use case characteristic;

receive data representing a selection of a particular pre-trained ML model of the plurality of pre-trained ML models; and train the particular pre-trained ML model via the ML service to yield a trained ML model.

16. The system of claim 15, wherein:

the model construction service comprises instructions that upon execution cause the model construction service to:

cause a graphical user interface (GUI) to be displayed that allows a user selection of one of the plurality of pre-trained machine learning (ML) models satisfying the ML use case characteristic; and wherein data representing the selection of the particular pre-trained ML model represents a user selection via the GUI of the particular pre-trained ML model.

17. The system of claim 15, wherein the model construction service comprises instructions that upon execution cause the model construction service to:

cause a graphical user interface (GUI) to be displayed that allows a user specification of a location of a data set to use to train the particular pre-trained machine learning (ML) model;

receive data representing a user specification via the GUI of a particular location of a data set to use to train the particular pre-trained ML model; and wherein the particular pre-trained ML model is trained using a data set at the particular location.

18. The system of claim 15, wherein:

the model construction service comprises instructions that upon execution cause the model construction service to:

cause a graphical user interface (GUI) to be displayed that allows a user specification of a hyperparameter value to use to train the particular pre-trained machine learning (ML) model;

receive data representing a user specification via the GUI of a particular hyperparameter value to use to train the particular pre-trained ML model; and wherein the particular pre-trained ML model is trained using the particular hyperparameter value.

19. The system of claim 15, wherein the instructions upon execution further cause the model construction service to:

receive a deployment request associated with the trained ML model; and cause the trained ML model to be deployed.

20. The system of claim 19, wherein the model construction service, to cause the trained ML model to be deployed, is to:

configure the trained ML model to be run by the ML service; and create an endpoint to at least receive inference requests and provide the inference
requests to be used as input for the trained ML model.

* * * * *